Aug. 28, 1934.  E. B. GILL  1,972,068

ROTARY DRILL BIT

Filed Feb. 20, 1933  2 Sheets-Sheet 1

INVENTOR
Eldridge B. Gill.
BY
ATTORNEY

Aug. 28, 1934.　　　　　E. B. GILL　　　　　1,972,068

ROTARY DRILL BIT

Filed Feb. 20, 1933　　2 Sheets-Sheet 2

INVENTOR
Eldridge B. Gill.
BY
Arthur C. Brown
ATTORNEY

Patented Aug. 28, 1934

1,972,068

UNITED STATES PATENT OFFICE 1,972,068

ROTARY DRILL BIT

Eldridge B. Gill, Oklahoma City, Okla., assignor to Bess L. Reed, Wichita, Kans.

Application February 20, 1933, Serial No. 657,558

30 Claims. (Cl. 255—71)

My invention relates to rotary drill bits and more particularly to cutter assemblies for bits of this character.

Among the numerous types of cutters heretofore devised, for mounting on bit heads of the character used in earth boring, are cutting disks and cutting rollers.

For drilling in comparatively soft earth formations the cutting disks embody the advantage of more rapid penetration while for the somewhat harder formations the cutting rollers are more satisfactory since they tend to pulverize the harder material.

The principal objects of my invention are to provide a cutter assembly embodying the combined advantages of both cutting disks and rollers and to further provide for adjusting cutting disks in relation to each other and to cutting rollers for selectively increasing or decreasing the effective cutting areas of the respective cutter members.

In accomplishing these and other objects of my invention I have provided improved details of structure, the preferred form of which is illustrated in the accompanying drawings, wherein.

Figure 1:
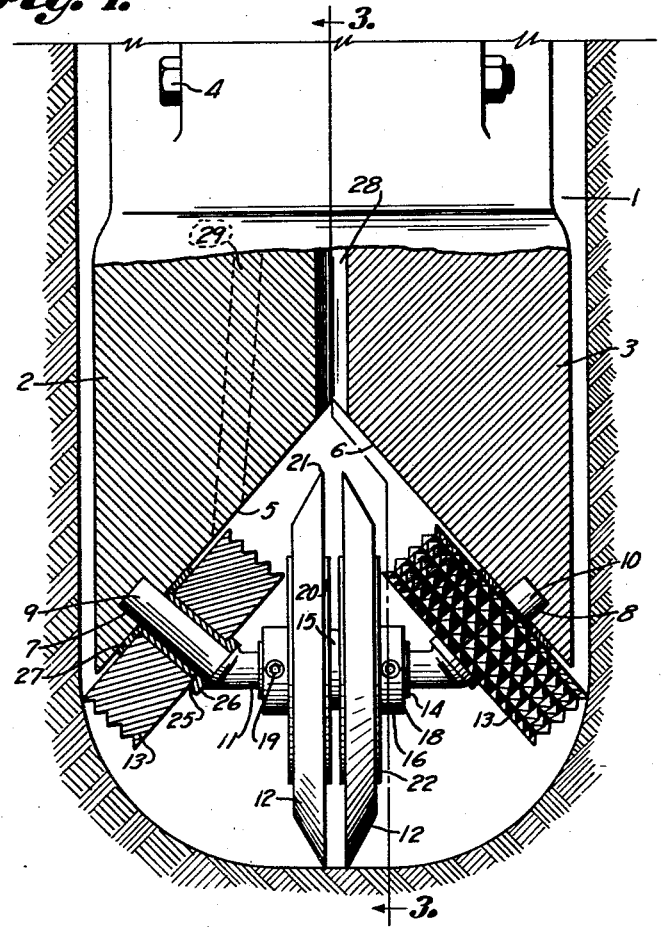
Fig. 1 is a view, partly in section, of the lower end of a bit head equipped with a cutter assembly embodying my invention, a cutting roller being shown in central section.
Figure 2:
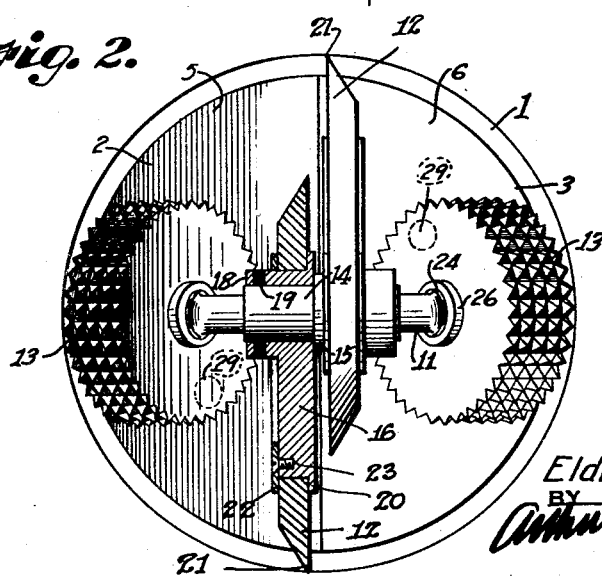
Fig. 2 is a bottom plan view of the cutter assembly and bit head with one of a pair of cutting disks shown in central section.
Figure 3:
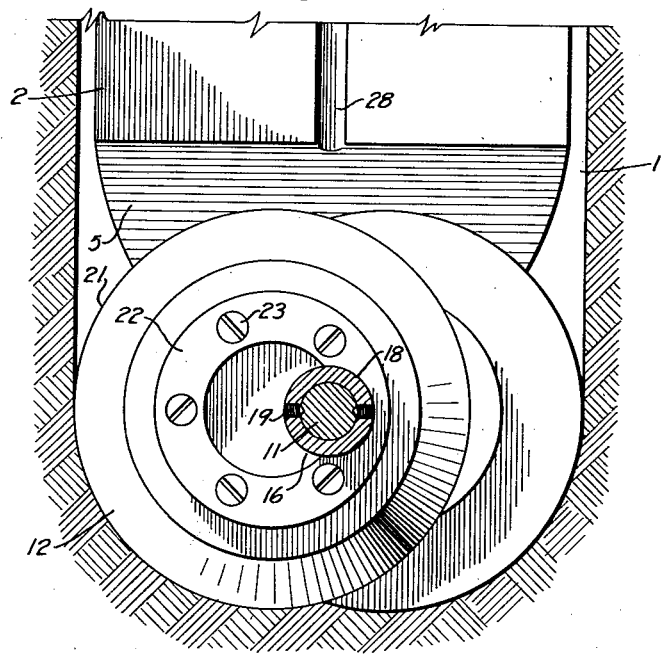
Fig. 3 is a cross section of the cutter assembly on the line 3—3, Fig. 1, illustrating particularly the adjustable eccentric mounting of the cutting disks.

Referring more in detail to the drawings:

1 designates a bit head preferably comprising halves 2 and 3 firmly connected by bolts 4 and having diverging plane lower faces 5 and 6 respectively.

Extending into the plane faces at substantially right angles thereto, adjacent their lower ends are sockets 7 and 8 for seating the reduced ends 9 and 10 of a cutter shaft 11.

In order to provide for mounting both cutting disks 12 and cutting rollers 13 on the shaft in a manner to cooperate for drilling a hole, the shaft is provided with an enlarged central or body portion 14 in transverse relation to the axis of the bit head while the reduced ends 9 and 10 extend at an obtuse angle from the body portion to concentrically align with the sockets of the bit head.

Figure 4:
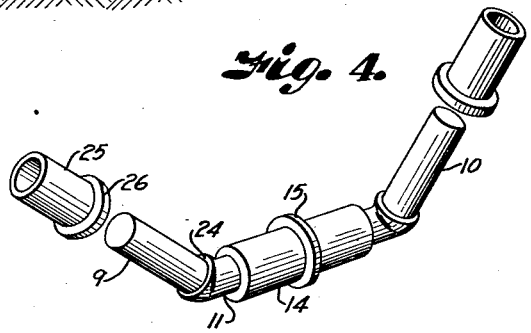
Fig. 4 is a perspective view of the cutter shaft and bearing members in disassembled relation.
Figure 5:
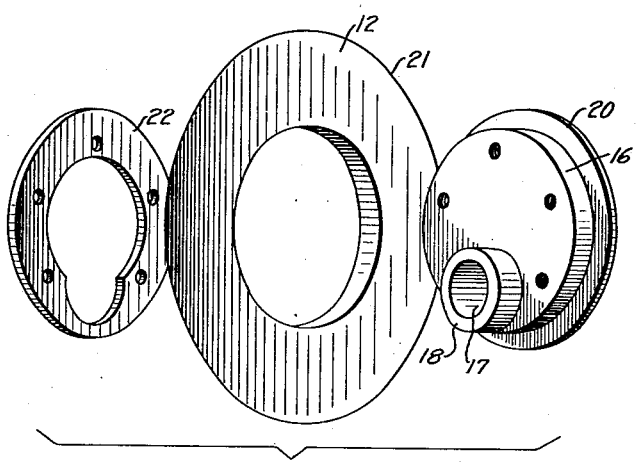
Fig. 5 is a perspective view of a cutting disk, eccentric and retaining plate in disassembled relation.

As is most clearly shown in Fig. 4, the body portion of the shaft is preferably provided on its transverse center line with a flange 15 serving to space a pair of eccentrics 16 provided with openings 17 for snugly receiving the enlarged body portion and having extension bosses 18 concentric with the openings wherein set screws or the like 19 may be threaded to secure the eccentrics against rotation on the shaft.

A radial flange 20 formed on each eccentric adjacent its inner edge provides a stop shoulder for one of the cutting disks 12 mounted for rotation on the eccentric and having an inwardly tapering cutting edge 21, the disk being held on the eccentric by a retaining plate or ring 22 secured thereto in any suitable manner as by screws 23.

Thus it will be noted that by adjusting the eccentrics on the body portion of the cutter shaft the disks may be moved as required to cooperatively describe a smaller or larger circle when the bit head is rotated.

It is desirable, however, to use the cutting roller 13 in conjunction with the disks and in order to mount the former members for free rotational movement on the shaft 11, thrust shoulders 24 are formed on the shaft at the point of juncture of the shaft ends and body portion, it being evident that these shoulders must be of sufficiently small diameter to permit passage thereover of the eccentrics. Bushings 25 are sleeved over the reduced ends 9 and 10 for bearing engagement with the thrust shoulders and are provided with radial flanges 26 for abutting the inner faces of the cutting rollers 13 adapted to be rotatably mounted on the sleeves.

Thrust washers 27 may be inserted between the outer faces of the cutter rollers and diverging faces of the bit head to reduce friction between these members.

An axial channel 28 is provided in the bit head for conducting drilling fluid from a conventional rotary drill stem to the cutting disks, and branch channels 29, preferably open through the diverging faces of the bit heads at points behind the centers of the cutting rollers with reference to their direction of rotation so that cuttings will be washed from the rollers.

Assuming a cutter assembly to be constructed as described and a bit head to be provided with sockets for receiving the reduced ends of the cutter shaft, the manner of assembling and adjusting the members and the operation of the drill would be as follows:

The eccentrics are sleeved on the body portion of the shaft from opposite ends thereof and the disks are rotatably mounted thereon with their tapered cutting edges positioned adjacent each other. After confining the disks on the eccentrics by means of the retaining rings, a roller cutter is mounted on each of the shaft ends which are thereupon seated in the sockets of the halves 2 and 3 before the halves are firmly bolted together.

If a hole is to be drilled in relatively soft formation the disks are adjusted outwardly from the axis of the bit to receive the major portion of the drilling load, whereas, if the formation is comparatively hard the eccentrics may be turned inwardly and locked on the shaft to transmit more of the load to the cutting rollers.

The cutting rollers are intended principally, however, to provide bearing points in transverse relation to the cutting points of the disks for insuring a straight hole and to further assist in moving the cuttings toward the center of the bore into the stream of well fluid for removal thereby from the well.

What I claim and desire to secure by Letters Patent is:

1. A rolling cutter unit comprising side roller cutters mounted on axes inclined downwardly and inwardly towards the axis of the unit, and two rolling scrape type center cutting discs mounted on axes offset laterally from a vertical plane extending through the inclined axes, the side cutters adapted for contacting the bottom of a bore hole outwardly from the area cut by the discs, and all of the cutter axes being in planes parallel to each other.

2. A rolling cutter unit comprising inclined rolling side cutters adapted for contacting the bottom of a bore hole to cut clearance for the unit, and scrape type rolling cutting discs having their axes in a horizontal plane laterally of a radial plane and adapted for cutting the area between the side cutters, the axes of all of the cutters being in parallel planes.

3. A rolling cutter assembly having toothed rolling side cutters mounted on axes inclined to the axis of the assembly and adapted for contacting the bottom of a bore hole, and scrape type rolling cutting discs positioned between the side cutters for cutting an area inwardly of the side of the bore hole, all cutter axes being in planes parallel to each other.

4. A cutter unit for rotary drill bits comprising a shaft, including a central body portion and spindles extending angularly from the ends of the body portion, bearing members eccentrically mounted on the central body portion of the shaft and fixed thereto, cutters rotatably mounted on said bearing members, and cutters rotatably mounted on said spindles, the spindle axes being in parallel planes.

5. In a roller bit, the combination of toothed rolling side cutters mounted on inclined axes, and rolling, scrape type center cutting discs, both cutters and discs adapted for contacting the bottom of a bore hole, the axes of the center cutting discs being offset laterally from a vertical plane passing through the longitudinal axis of the bit, and all of the cutter axes being in planes parallel to each other.

6. In combination with a bit head including end legs having upwardly converging, inclined inner faces, side cutters rotatably mounted adjacent said legs on axes perpendicular to said inclined faces, and other cutters rotatably mounted between the first named cutters on axes perpendicular to the plane of the longitudinal axis of said head, all of the cutter axes being in planes parallel to each other.

7. In combination with a bit head including end legs having inclined inner faces, side cutters mounted adjacent said legs on axes perpendicular to said inclined faces for rotation in circular paths intersecting projections of the periphery of the head, and other cutters eccentrically mounted between the first named cutters for rotation in circular paths intersecting a transverse plane coincident with the termini of said legs, all of the cutter axes being in planes parallel to each other.

8. In combination with a bit head including end legs having inclined inner faces, side cutters mounted adjacent said legs on axes perpendicular to said inclined faces for rotation in circular paths intersecting projections of the periphery of the head, and other cutters eccentrically mounted between the first named cutters on axis perpendicular to the plane of the longitudinal axis of the head for rotation in circular paths intersecting a transverse plane coincident with the termini of said legs, all of the cutter axes being in planes parallel to each other.

9. In combination with a bit head having a substantially V-shaped opening in one end forming spaced legs, a shaft having a central portion perpendicular to the plane of the longitudinal axis of the head and end portions extending angularly to the central portion and attached to said legs to mount the shaft in said opening, side cutters rotatably mounted on the angular shaft portions and intersecting the extended periphery of said head, and cutters rotatably mounted on the central portion of the shaft and intersecting a transverse plane coincident with the ends of the legs, all of the cutter axes being in planes parallel to each other.

10. In combination with a bit head having a substantially V-shaped opening in one end forming spaced legs, a shaft having a central portion perpendicular to the plane of the longitudinal axis of the head and end portions extending angularly to the central portion and attached to said legs to mount the shaft in said opening, side cutters rotatably mounted on the angular shaft portions and intersecting the extended periphery of said head, and cutters eccentrically mounted on the central portion of said shaft and adapted for travel in circular paths intersecting a transverse plane coincident with the ends of the legs, all of the cutter axes being in planes parallel to each other.

11. In combination with a bit head having a substantially V-shaped opening in one end forming spaced legs, a shaft having a central portion perpendicular to the plane of the longitudinal axis of the head and end portions extending angularly to the central portion and attached to said legs to mount the shaft in said opening, side cutters rotatably mounted on the angular shaft portions and intersecting the extended periphery of said head, cutters rotatably mounted on the central portion of the shaft and intersecting a transverse plane coincident with the ends of the legs, and shoulders at the inner ends of the angular portions of the shaft for retaining the side cutters adjacent the inner faces of said legs, all of the cutter axes being in planes parallel to each other.

12. In an earth boring tool, a drill head, a spindle having its ends connected to the under side of the drill head, inclined bearing surfaces at the end portions of said spindle having their axes lying in the same plane, and bearing surfaces at the central portion of the spindle, the axes of the central bearing surfaces lying in planes spaced from and parallel with the plane of the end bearing surfaces, and roller cutters rotatably mounted on said bearing surfaces.

13. In an earth boring tool, a drill head, a spindle having its ends connected to the under side of the drill head, bearing surfaces at the end portions of said spindle having axes lying in the same vertical plane, bearing members on the spindle at the central portion thereof and providing bearing surfaces eccentric with the axis of the central spindle portion, the axis of the central portion of the spindle lying in said vertical plane, and roller cutters rotatably mounted on said bearing surfaces.

14. An earth boring tool according to claim 13 in which said bearing members are adjustable about the axis of the central portion of the spindle.

15. In an earth boring tool, a drill head, a roller cutter carried at the side thereof adapted to cut an annular area of the bottom of the hole adjacent the side wall thereof, a second roller cutter located substantially in the axial center of the drill head for cutting an area at the bottom of the hole from the center outwardly, and means for shifting the position of the second named cutter whereby the area at the bottom of the hole cut thereby may be changed relative to the area tracked by the first named cutter.

16. In a rotary deep well drill a bit head, a roller at one side thereof adapted to cut an annular area of the bottom of the bore hole adjacent its side wall, a second roller cutter located substantially at the axis of rotation of the bit head for cutting an area of the bottom of the hole from the center thereof outwardly, and means for shifting the axis of rotation of the second named cutter for shifting the outer diameter of the path cut thereby.

17. An earth boring tool according to claim 15 in which the first named cutter is a cylinder having peripheral teeth and said second named cutter is a cutter of the scrape type.

18. An earth boring tool according to claim 15 in which the first named cutter is a cylinder having its axis inclining upwardly and outwardly and the second named cutter is of the scrape type having its axis lying in a horizontal plane.

19. An earth boring tool according to claim 15 in which the axes of said cutters lie in substantially parallel vertical planes.

20. In an earth boring tool, a drill head, a roller cutter carried at the side thereof adapted to cut an annular area at the bottom of the hole from the side of the hole inwardly, a roller cutter carried near the axial center of the drill head of less diameter than the hole to be cut, the second named cutter cutting a circular area at the bottom of the hole from the center outwardly, the minimum diameter of the path cut thereby extending substantially to the inner limit of the path tracked by the first named cutter, and means for adjusting the second named cutter away from the axis of the drill head to enlarge the area cut by the second named cutter.

21. An earth boring tool according to claim 20 in which said means includes an eccentric bearing for the cutter, and a retaining device for holding the cutter at desired positions on the bearing.

22. An earth boring tool according to claim 20 in which the second named cutter is adjustable laterally of the vertical plane through the axis of the first named cutter.

23. An earth boring tool according to claim 20 in which the axis of the first named cutter lies in a radial plane of the drill head and the second named cutter lies in a plane parallel with and laterally spaced from said radial plane.

24. In an earth boring tool, a drill head, a pair of cylindrical roller cutters carried at the side thereof for cutting an annular area at the bottom of the hole from a point beyond the center of the hole to the side wall thereof, the axes of said cutters being inclined upwardly and outwardly, a pair of scrape type roller cutters disposed between the cylindrical cutters for cutting a circular area at the bottom of the hole from the center outwardly, the axes of said scrape type roller cutters lying in a horizontal plane, and means for adjusting the positions of the scrape type cutters relative to the drill head axis whereby the area at the bottom of the hole cut by the scrape type cutters may be enlarged to reduce the area of the hole bottom remaining to be cut by the cylindrical cutters.

25. An earth boring tool according to claim 24 in which the axes of the cylindrical cutters lie in a diametrical plane of the drill head, and the axes of the scrape type cutters lie in planes parallel with and on opposite sides of said diametrical plane.

26. A rotary earth boring drill comprising a bit head, a pair of rotary cutters of scrape disc type whose axes are in parallel vertical planes on opposite sides of the vertical axis of the drill, and side roller cutters whose axes are in the same vertical plane which passes through the vertical axis of the drill, said side roller cutters diverging downwardly and outwardly from the sides of the scrape cutters which lie substantially between them, all the cutters being at the lower end of the drill, and all cutting the bottom of the hole, said scrape cutters projecting from between the side cutters downwardly below the horizontal plane in which the lowermost edges of the side cutters lie, said side cutters having peripheral cutting surfaces of substantial width to cut an annular area, the outer margin of which is beyond the projected side of the bit head, and the inner margin of which is of a diameter less than the maximum diameter of the area initially cut by the scrape disc cutters, substantially as described.

27. In an earth boring tool, a drill head, at least one roller cutter carried near the axial center of the drill head for cutting on the bottom of the hole, and at least one roller cutter carried near the side of the drill head for cutting the bottom of the hole, the axes of said cutters lying in spaced substantially parallel vertical planes, and the axis of the side cutter lying in a radial plane of the drill head.

28. In an earth boring tool, a rotary bit head, a toothed roller cutter of substantial width carried thereby for cutting the bottom of the hole adjacent the side wall of the hole, and a scrape cutter of the disc type located adjacent the axis of rotation of the drill head for operating in advance of the first named cutter and cutting the bottom of the hole from the center outwardly to an initial diameter substantially larger than the inner diameter of the path of travel of the first named cutter.

29. In an earth boring tool a rotary bit head, scrape cutter means of the disc type located adjacent the axis of rotation of the drill head for cutting the bottom of the hole from the center outwardly, and toothed side roller cutter means presenting peripheral cutting surfaces of substantial width, said side roller cutter means cutting a path no higher than the maximum diameter at the bottom of the hole cut by the scrape disc cutter means, and said side roller cutter means tracking a minimum diameter less than the maximum diameter cut by the scrape disc cutter means.

30. In a deep well drill, a drill head rotatable about a vertical axis and having a reentering recess at its lower end, a pair of disc cutters mounted in said recess for rotation about axes offset from each other and perpendicular to a vertical plane intersecting the axis of rotation of the bit head, and a peripherally toothed side roller cutter in said recess between a side wall thereof and the side of the adjacent disc cutter, the toothed roller cutter diverging downwardly in relation to said side of said disc cutter, and the periphery thereof forming with said side of the disc cutter a wide angle, a part of said periphery being disposed below and beyond the drill head.

ELDRIDGE B. GILL.